Figure 1:
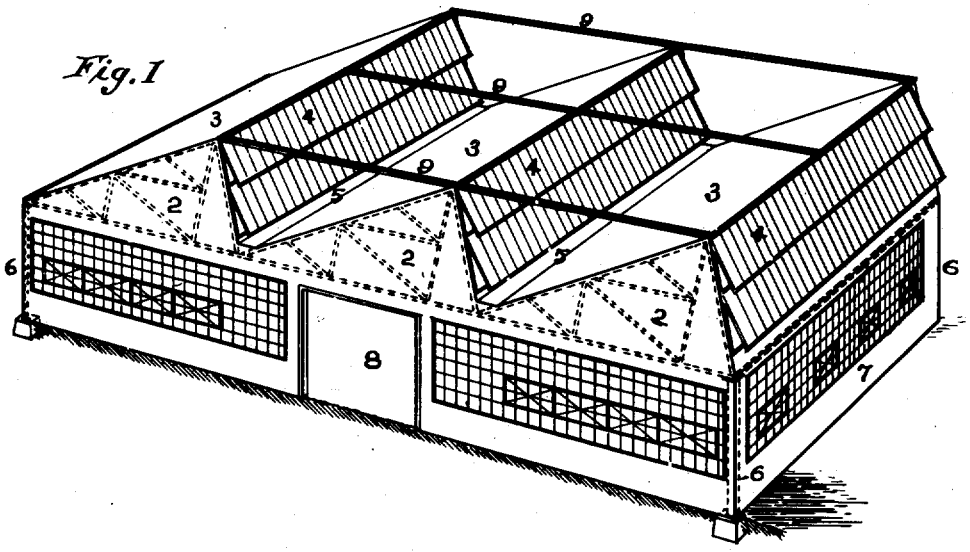

W. F. BALLINGER AND C. H. SHIVERS.

ROOF STRUCTURE.

APPLICATION FILED MAY 5, 1921.

Reissued June 28, 1921. 15,133.

4 SHEETS—SHEET 1.

INVENTOR

Walter F. Ballinger

Clifford H. Shivers

BY

ATTORNEY

W. F. BALLINGER AND C. H. SHIVERS.

ROOF STRUCTURE.

APPLICATION FILED MAY 5, 1921.

Reissued June 28, 1921.

15,133.

4 SHEETS—SHEET 2.

INVENTOR

Walter F. Ballinger

Clifford H. Shivers

BY

ATTORNEY

W. F. BALLINGER AND C. H. SHIVERS.

ROOF STRUCTURE.

APPLICATION FILED MAY 5, 1921.

Reissued June 28, 1921.

15,133.

4 SHEETS—SHEET 3.

INVENTOR
Walter F. Ballinger
Clifford H. Shivers
BY
ATTORNEY

W. F. BALLINGER AND C. H. SHIVERS.

ROOF STRUCTURE.

APPLICATION FILED MAY 5, 1921.

Reissued June 28, 1921.

15,133.

4 SHEETS—SHEET 4.

INVENTOR
Walter F. Ballinger
Clifford H. Shivers
BY
ATTORNEY

UNITED STATES PATENT OFFICE.

WALTER F. BALLINGER, OF PHILADELPHIA, PENNSYLVANIA, AND CLIFFORD H. SHIVERS, OF WOODBURY, NEW JERSEY, ASSIGNORS, BY MESNE ASSIGNMENTS, TO SAID BALLINGER.

ROOF STRUCTURE.

15,133. Specification of Reissued Letters Patent. Reissued June 28, 1921.

Original No. 1,347,669, dated July 27, 1920, Serial No. 314,526, filed July 31, 1919. Application for reissue filed May 5, 1921. Serial No. 467,203.

*To all whom it may concern:*

Be it known that we, WALTER F. BALLINGER and CLIFFORD H. SHIVERS, both citizens of the United States, and residing, respectively, in Philadelphia, county of Philadelphia, and State of Pennsylvania, and Woodbury, county of Gloucester, and State of New Jersey, have invented an Improvement in Roof Structures, of which the following is a specification.

Our invention relates to that type of roofing known as saw-tooth construction, and has for its object the provision of special means whereby the usual and heretofore necessary walls, piers, or posts for support may be largely eliminated to provide greatly lessened construction within the room space of the building.

Heretofore it has been customary in buildings having roofs of saw-tooth construction, to provide a plurality of supporting walls, piers, or posts along the longitudinal junctures and below the transverse gutter elements of the respective tooth portions of the roof structure as a whole, and while the saw-tooth construction of roofs with their oblique sash for light and ventilation are most excellent and efficient for industrial plants, as well as being relatively low in cost, there has been considerable objection to their use on account of the large number of points of support which has heretofore been required for stability and which necessitated upright walls, posts or piers distributed throughout the room space beneath the roof, said walls, posts or piers interfering very materially with distribution of machinery and also with the freedom of movement within the room space such as would be required in automobile stations and those characters of industrial plants where the transference of merchandise and stock is constantly being required.

We have found, that by special construction, comprehending the tying together of the several ridges of the saw-tooth structures of the roof by means of longitudinal upper compression chords and association therewith corresponding tie or tension chord members at the base of the roof respectively below the said compression chords and continuous for the extent of the saw-tooth sections which are connected by the said upper compression chords, parallel super-span trusses are formed, and further, that by combining these super-span trusses with deep transverse trussed girders arranged at one and preferably more of the high portions of the saw-tooth sections (to which transverse girders the compression and tension chords are connected), great transverse width of roof span is provided. By these improvements we are enabled to convert what has heretofore been a weak sectional construction, requiring a large number of under supports intermediate of the four corners, into a rigid self-supporting unitary structure, having great strength both longitudinally and transversely, and whereby all supports, excepting those at the immediate corners, may be eliminated. We have further found that, by reason of these improvements, permitting the elimination of many of the numerous supports heretofore necessary, we can for the available floor space provided, materially cheapen the total cost of construction of a building, while maintaining the strength of its roof; and further obtain the additional advantages arising from elimination of the obstructing supports heretofore deemed necessary in the room space.

With the above and other objects in view, the nature of which will be more fully understood from the description hereinafter, the invention consists in the novel construction of roofs for buildings, as hereinafter more fully described and defined in the claims.

Figure 2:
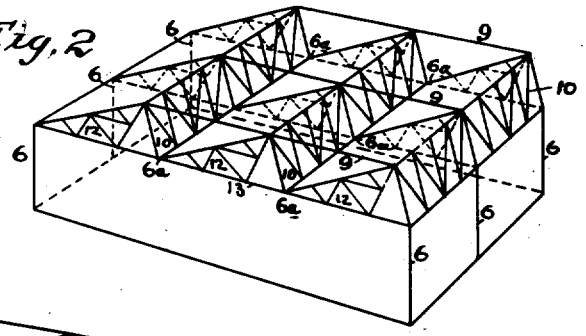
Figure 2A:
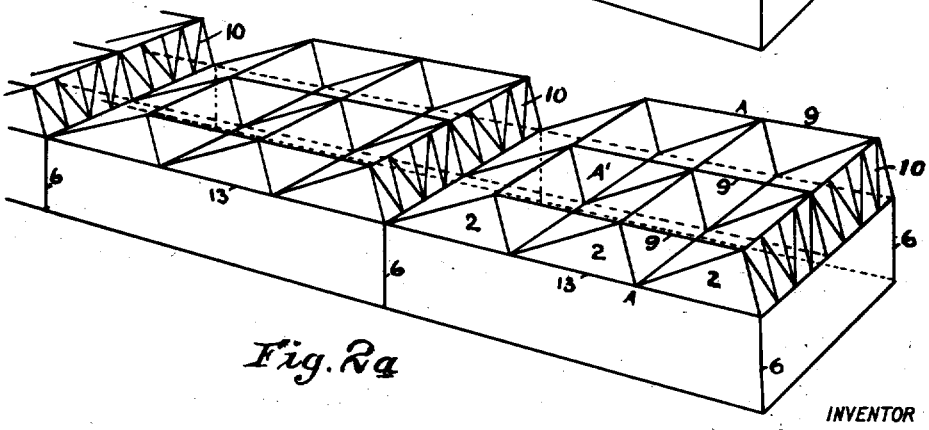
Figure 3:
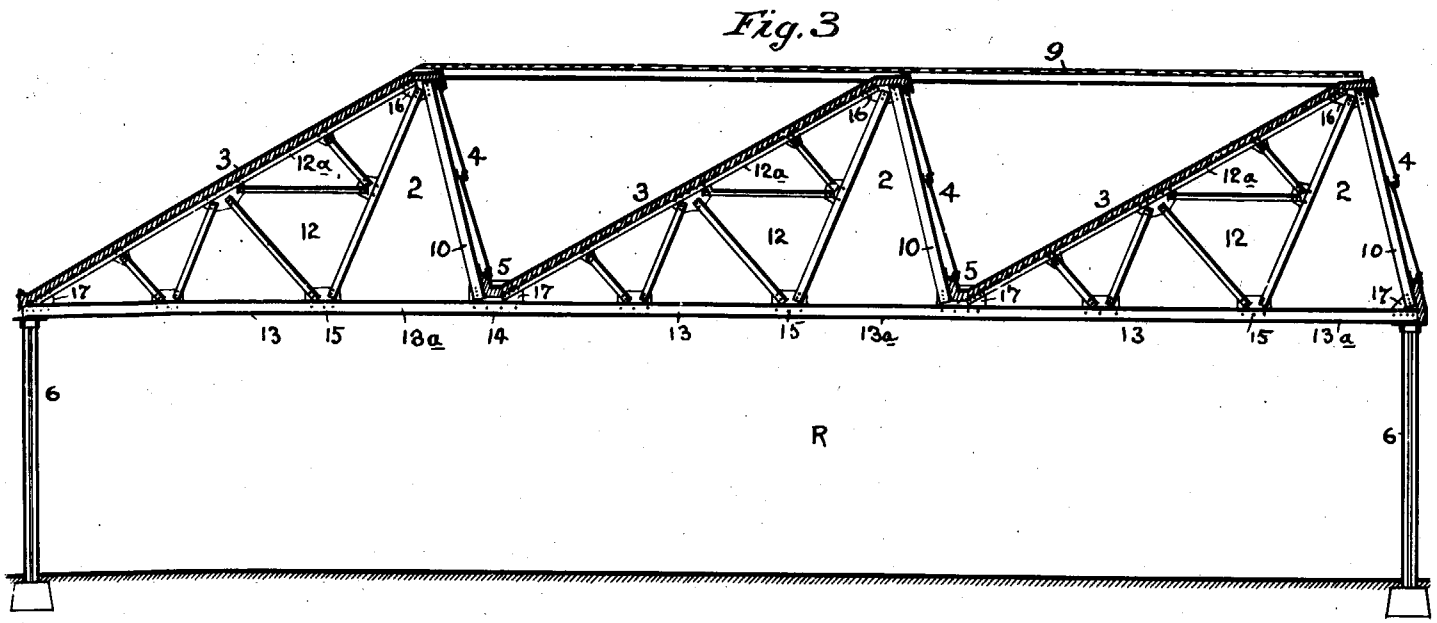
Figure 3A:
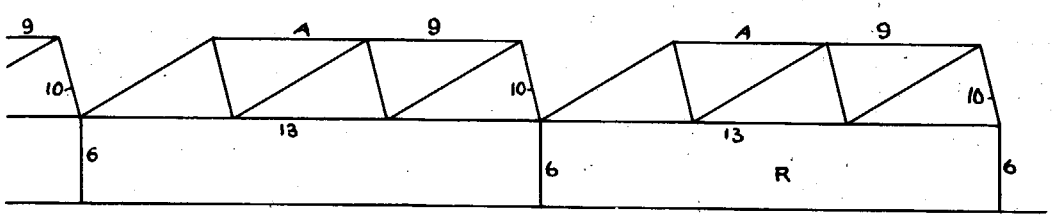
Figure 4:
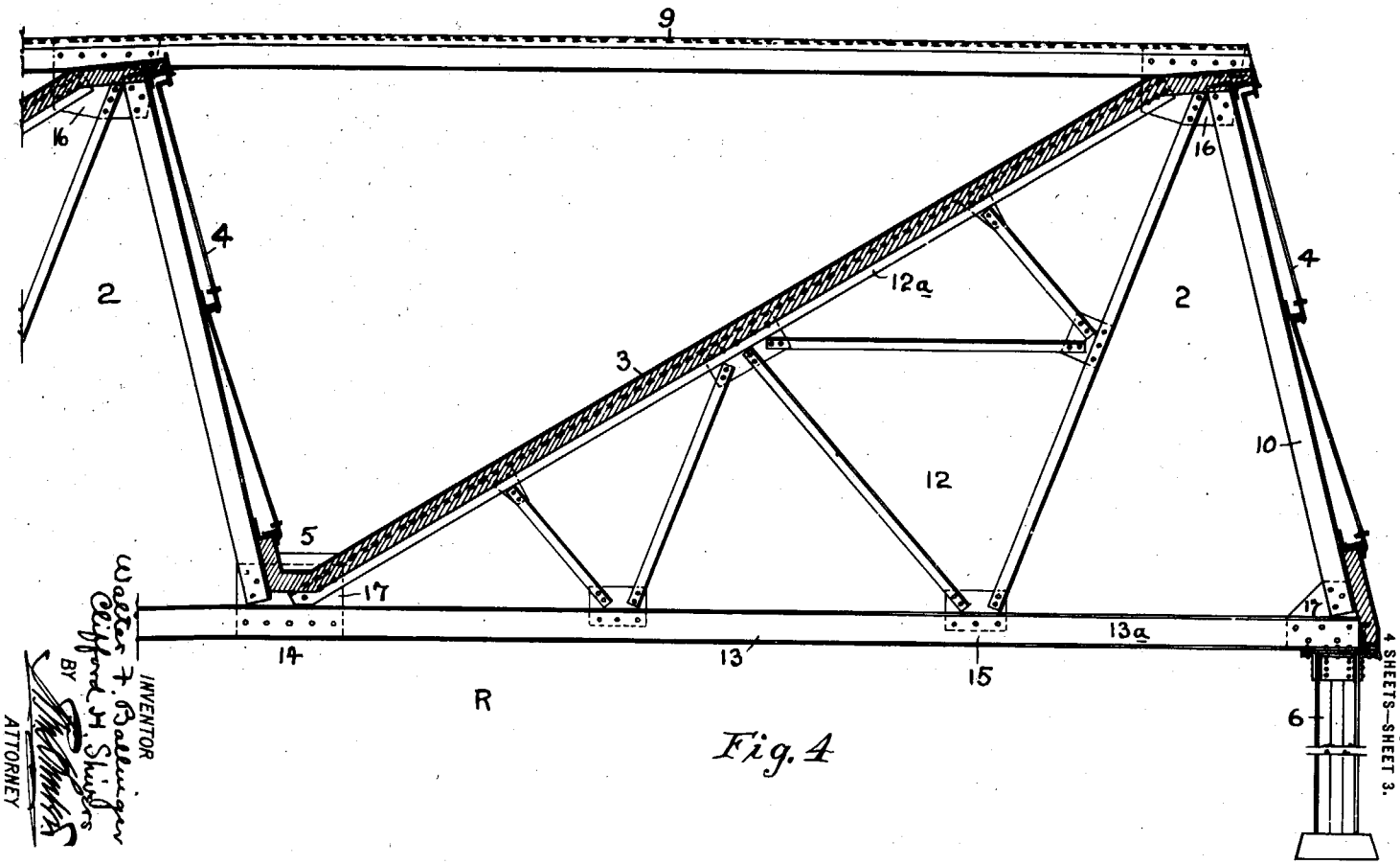
Figure 5:
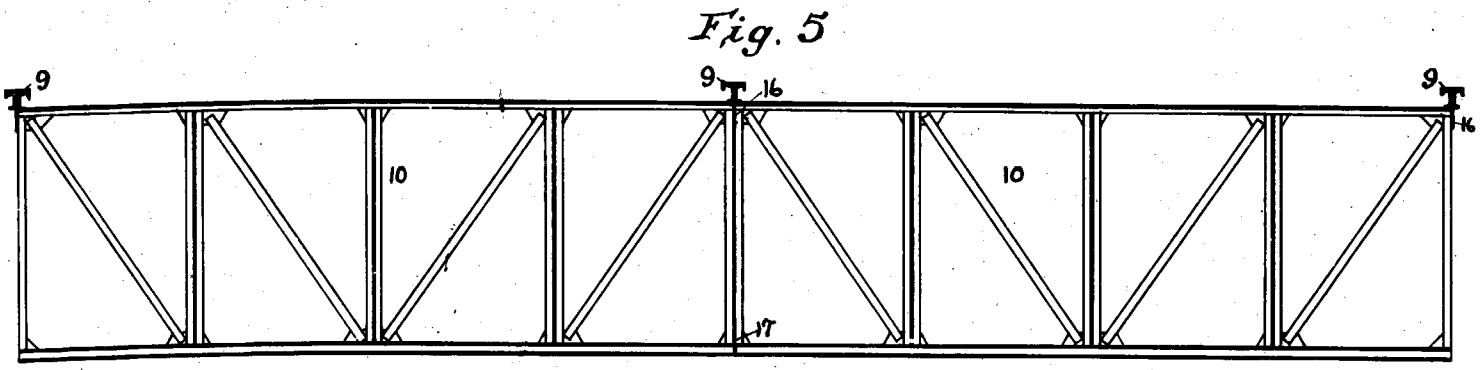
Figure 6:
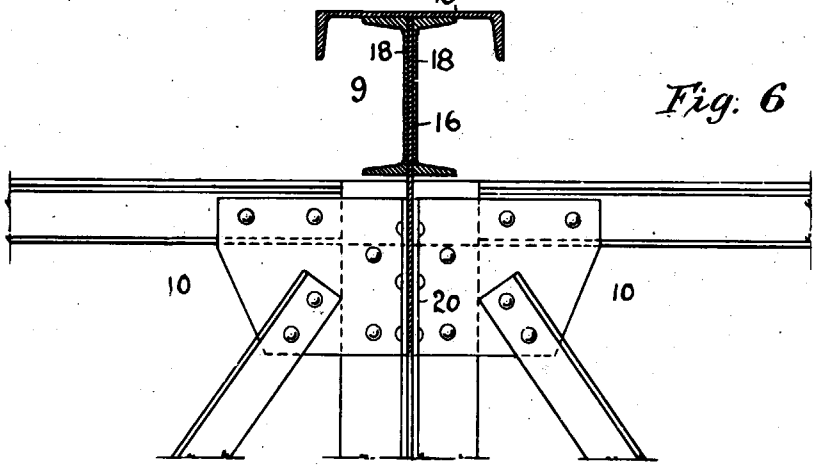

Referring to the drawings: Figure 1 is a perspective view illustrating a building embodying our invention; Fig. 2 is a perspective skeleton view intended to illustrate the general girder structures employed in the building shown in Fig. 1; Fig. 2ª is a similar view but showing two connecting sections of roof structure; Fig. 3 is a longitudinal sectional elevation illustrating a building having a roof embodying our invention; Fig. 3ª is a side view diagrammatically showing the relation of connecting roof sections; Fig. 4 is a similar section of a portion of Fig. 3 on a larger scale; Fig. 5 is a transverse elevation of the roof girders at one end of the building; and Fig. 6 is an enlarged transverse section of one of the longitudinal chords and the means of connection with the truss and girder structures of the saw-tooth portions of the roof.

A general understanding of the nature of the invention will be, perhaps, best had by reference to Figs. 1 and 2 which illustrate in perspective a general view of a building having a saw-tooth roof structure. In these figures, 2 represents a plurality of saw-tooth roof sections which are arranged side by side in series and provide the solid roof portions 3 and the sash portions 4, which furnish light to the interior and suitable means for ventilation. This roof structure has been made of a width to span from wall to wall or from the walls to intermediate posts, according to the total width necessary. In the particular illustration, we have indicated a width of building which would approximate two complete saw-tooth roof portions joined side to side to widen the covering of the building. At the juncture between the inclined roof portions 3 and the inclined sash portions 4 there are arranged transverse gutters 5 and the vertical thickness of the framing at these gutter points have been exceedingly small, so that there was no strength against bending at these places. For this reason, it has heretofore been necessary to provide, not only under the four corners of the roof, suitable supporting posts or piers, but it has also been necessary to place walls, piers or posts immediately under the said portions of the roof structure in alinement with the gutters 5, so that in reality each of the saw-tooth portions of the entire roof have at least four points of support. When the width is doubled, then it has been heretofore necessary not only to provide the outer walls and the outer posts or piers 6, but also to provide additional walls, piers or posts within the building and within the room space under each gutter portion where the duplicate roof structures are joined.

In the roof structure as heretofore employed, it has been necessary not only to provide the posts or positive means of support at the parts marked 6 in Fig. 2, but also at the points marked 6ª in said figure, from which it will be seen that in a small roof, having only three saw-tooth sections in length and of a double width, there is required six additional posts or piers or means of support, or double the number which is required in the construction which is embodied in our present invention. The great advantage of this elimination of the intermediate supports is apparent from the fact that the room space is kept reasonably clear of obstructions and a very material economy in construction is also insured.

Referring again to Fig. 2, which is intended (in a diagrammatic manner) to illustrate the main features of the preferred truss construction, it will be seen that the roof is made up of the three super-span trusses, each comprising the lower chord 13, the upper chord 9 and intermediate substantially triangular trusses 12 (partly supporting the solid roof portions 3), in association with the transverse trussed girders 10, which, in the most desirable form, come immediately back of the sash portions 4. More or less of the transverse trussed girders may be employed, so long as they properly support the intermediate super-span trusses where necessary and insure support from the same supporting means as the outer super-span trusses. In this case, the intermediate post 6 at front and rear ends may be omitted, as more particularly pointed out hereinafter. In this diagram we have only illustrated three of these intermediate trusses 12 in the transverse width of the roof in any saw-tooth section thereof, but it is to be understood that any desired number of these intermediate trusses or other suitable roof supports may be employed according to the width of the building and the roofing weight to be sustained. In Fig. 2ª, is shown the super-span trusses A and A′ of connecting saw-tooth roof sections, such as two sections shown in Figs. 1 and 2, and as continuations for the same inclosure. In this case, we have shown two of the transverse truss girders 10 which are supported upon the four corner posts 6, and which truss girders support the intermediate super-span truss A′ without any posts under it (as in Fig. 1). Additional transverse girders may be employed, as desired.

As before stated, the general form of the saw-tooth roof is old and well known and the improvements constituting our invention are more particularly directed, in part, to the provision of the longitudinal upper compressive chords 9 which are rigidly secured to the upper parts of the saw-tooth truss sections 12 and preferably to the peaks or ridges thereof and also in employing lower chords 13 which are continuous, mechanically, throughout the total base length of the corresponding series of saw-tooth truss sections within the structure of the super-span trusses, the lower chords acting as ties or tension members, while the upper chords 9 act as struts or compressive members. It is manifest that while the best results will be obtained by arranging the top chords 9 to connect with the peaks or ridges of the roof structure, as shown at 16, nevertheless, it will suffice for the said chords to be connected with the saw-tooth truss sections 12 at a reasonable distance below the peaks or ridges of the roof, so long as the compression strains are properly sustained and the necessary rigidity insured. It will further be seen that the triangular relation of the intermediate trusses 12 and the transverse trussed girders 10 with the upper compressive chords 9 and the lower tension chords 13, provide a most rigid construction, longitudinally considered, and which will insure the plurality of saw-tooth sections being self-supporting intermediate of the front and rear ends thereof; that is to say, all intermediate posts under the gutter portions 5 may be eliminated.

In Fig. 1, the walls of the building at 7 and 8 may be of the lightest construction and, if desired, almost entirely of sash, as it is not necessary that there shall be any posts in the entire structure except at the four corners. If the building is of very great width or equivalent to double the usual width as commonly employed, then and in that event it may be desirable, though not essential, to place two additional posts 6, one intermediate of the front corner posts and the other intermediate of the rear corner posts, as is indicated in Fig. 2. In this construction, the transverse trussed girders 10 of the several saw-tooth sections may be double the length in the transverse direction or width of the building, as is indicated in Figs. 2 and 5. If we assume that, in Fig. 1, the saw-tooth structure of the roof was intended to correspond in width to a normal building, then and in that event the middle chord 9 may be dispensed with, if desired, and reliance placed upon the outer chords 9 together with a sufficient strength of the transverse trussed girders 10. If, however, it is desired to double the width of the building or make it materially wider than the normal width between the usual rows of supports, then the transverse trusses may be so combined with an upper intermediate chord 9 and a lower intermediate tie chord 13 that ample strength may be provided for the roof load without any intermediate supports in the room space below, and in fact, if desired, even at the end of the building intermediate of the corner posts. This, however, is not a material requirement in connection with the outer walls of the building, but where the saw-tooth construction is to be repeated (Fig. 3[a]) longitudinally for great lengths, several hundred feet or more, then it is desirable to reduce to a minimum any of the post supports which would objectionably obstruct the room space. In this connection, it is manifest that the intermediate super-span trusses are supported wholly by the transverse trussed girders 10 and this benefit will accrue even when the transverse trussed girders are less in number than the saw-tooth portions. It is, of course, to be kept in mind that where it is cheaper to introduce a reasonable number of intermediate supports in a wide room, and by so doing reduce the vertical height of the transverse trusses 10 with a corresponding cheapening in cost, such modification would be dictated by the engineering necessities of the case.

Referring more in detail to the construction employed in the making up of our improved roof, we have illustrated in Fig. 3 a full length roof area of three saw-tooth sections in which there are no supporting posts intermediate of the end posts 6 in the room R, whereas in the former constructions there would have been posts or equivalent means of support adjacent to the points 14 below the gutters 5. As before stated, 2 represents the saw-tooth structure, 3 the cement or other solid roof covering, and 4 the sash structure. The roof structures 3 are supported in part upon a plurality of intermediate trusses 12 which are triangular in shape and suitably braced or trussed to provide rigidity to the superspan truss; these secondary trusses having the oblique beams or purlins 12[a] upon which the roof proper is in part supported. In the case of the trusses 12, which are associated with the super-span trusses, their bottom chords 13 are continued in tie members 13[a] which extend over and connect with the end of the bottom chord 13 of the next intermediate truss section 12 and so on, so that the bottom chord formed by the parts 13 and 13[a] may be continuous structurally and act as the bottom or tension chord for the whole length of the building comprised in the said three saw-tooth sections. This same condition would be maintained, if the length provided more or less saw-tooth sections, according to requirements. While the parts 13 constitute portions of the intermediate trusses 12, the continuance thereof, 13[a], extending between the point 15 of the one intermediate truss and the point 14 of the next intermediate truss (of the next saw-tooth section), constitutes a tie which is an essential part of our improvement. The construction just described is provided at both extreme sides of the roof and also intermediate of those sides, when considering a building of the character illustrated in Figs. 1 and 2, but in addition to the intermediate trusses 12 so provided in the super-span trusses, there may, if desired, be an additional number of such trusses or other means such as purlin members 12[a], designed solely for the support of the roof; though where a heavy superstructure is required for weighty shafting and other special means, additional tie sections 13[a] may be employed with the additional truss members 12, if preferred.

When constructing the saw-tooth roof structure with the embodiment of our improvements, the lower continuous tension chords 13 and 13[a] may be of continuous girder forms, as illustrated, and the same riveted by plate 17 to the lower parts of the transverse trussed girders 10 and oblique girders 12ª, as more fully shown in Fig. 4; and similarly, the upper portions of the intermediate trusses 12 may be provided with plates 16 by which they are riveted to the upper portions of the transverse trussed girders 10 and to the longitudinal upper compression chords 9. The transverse trussed girders 10 may be of the construction illustrated in Figs. 5 and 6, the same composed of top and bottom chords, vertical posts and oblique tie members to give vertical rigidity coupled with the desired span and permit the passage of light. The upper chord members 9 may be built up of a number of girder sections, as more fully illustrated in Fig. 6, the same comprising three channel girders, two of which, 18, 18, are secured back to back upon the top plates 16, aforesaid, and the third, 19, resting horizontally upon the top flange of the girders 18 and riveted thereto and with the end flanges projecting downwardly. We do not limit ourselves, however, to the particular cross section or make up of these top chords 19, but illustrate what we believe to be a built up girder suitable for the purposes herein described.

It will be noted from Figs. 5 and 6, that the two transverse trussed girder sections 10, 10, are abutted upon the plate 16 at the top and plate 17 at the bottom and riveted thereto, so as to constitute practically a continuous transverse trussed girder which, as illustrated in Fig. 1, may be supported at the ends only by the corner posts 6, 6. In the case of the girder at the extreme front end of the building, the said girder, composed of the sections or parts 10, 10, may, if desired, have an additional support immediately below the middle top chord 9, as indicated at 6 in Fig. 2. In the case of the other transverse trussed girders 10 (Fig. 3), they would be supported upon the tie members 13 and would not require any under support in the form of posts or piers. It is evident, however, that should there be any excessive overhead loads required to be carried, posts may be introduced below the transverse girders in a vertical plane below the middle super-span truss A′.

It will be understood that where the span of each of the saw-tooth structures along the tie members 13, 13ª is to be greater than the normal span, then the height of the trussed girder portions 10 may be increased or reinforced to provide support for the correspondingly increased super-span truss; and similarly where the transverse width of the roof structure is to be increased beyond that which has normally been the practice, this increase in the vertical height of the transverse girder 10 will be utilized to bridge the greater transverse distance required and supporting the intermediate super-span truss; and where the distance is to be very great, the said transverse girders 10 may be materially strengthened in manners well known in roof truss construction, and we, therefore, do not limit ourselves to the minor details.

From the construction above described, it will be seen that all of the truss work comprising the roofing structure is contained within the building and protected from outside weather conditions, with the single exception of the top chords 9 which, however, are simple in construction and which may be made of a form (Fig. 6) which will readily shed rain and easily protect itself against weather conditions. Considering the truss work shown in Fig. 3 as constituting the main or super-span truss, it will be seen that the transverse trussed girders 10 act as strut members between the top compression chords 9 and the lower tension chords 13, 13ª, whereas the trusses 12 constitute diagonal bracing which, as composite members, might be considered more properly as tension members in the case of the two saw-tooth sections to the right of Fig. 3; but the truss members 12 at the extreme left of Fig. 3 would, in a general way, act as equivalent to a strut or post to the super-span truss. If desired, the truss parts of trusses 12 (except part 12ª) may be omitted from all of these trusses except to the extreme left saw-tooth section in Fig. 3; also, if desired, the bracing trusses 12 may be omitted where heavy ceiling loads, such as shafting and pulleys, are not required to be supported.

For the purpose of illustrating our invention, we have shown in the accompanying drawings the embodiment thereof which is at present preferred by us, since the same is in the form which we have found in practice to give satisfactory and reliable results, but it is to be understood that we do not restrict ourselves to the details, as the same are susceptible in modification in various particulars without departing from the spirit or scope of the invention.

Having now described our invention what we claim as new and desire to secure by Letters Patent, is:—

1. An improved roof of saw-tooth construction, comprising a plurality of parallel trussed sections providing saw-tooth framing along the length of the building for supporting oblique roof covering portions and upright sash portions, said saw-tooth framing having a plurality of parallel tension chord members extending throughout the entire length of the roof structure at its base and supported at their ends, and a plurality of longitudinal compression chord members at a higher elevation than the tension chord members and rigidly secured to the upper portions of the framing of the several saw-tooth members and located above the main level of the roof covering and sash portions, combined with transverse trussed girders respectively extending along the high sash portion of each saw-tooth section and each having its upper portion secured to the compression chord members and its lower portion secured to the tension chord members and operating to support the roof transversely over great widths, and supports for the ends of the tension chord members.

2. A roof of the saw-tooth type, comprising a plurality of saw-tooth truss structures each provided with a transverse truss supporting glazed sash, said truss of a depth substantially equal to the maximum depth of the saw-tooth structures, oblique members supporting the oblique roof covering and sustained at their upper ends upon the transverse truss, a plurality of horizontal tie members of the plurality of saw-tooth truss structures united to form continuous lower tension chord members longitudinally of the entire roof structure and supporting the lower ends of the oblique members, combined with a plurality of longitudinal compression chord members arranged above the roof of the saw-tooth truss structures and securely attached to the respective upper portions thereof and to their transverse trusses to positively connect said saw-tooth truss structures and hold their upper portions apart in a direction with respect to the length of the roof, said tension and compression chord members spaced apart laterally with respect to the transverse trusses and secured respectively to the lower and upper portions thereof.

3. An improved roof of saw-tooth construction which comprises a plurality of parallel truss forms providing saw-tooth framing for supporting the roof covering portions and upright sash, the framing for supporting the sash consisting of rectangular open-mesh trussed girders respectively arranged transversely at the high portions of each of the saw-tooth sections in the roof and supporting it intermediate of its ends against sagging, tension chord members extending longitudinally of the roof at its bottom portion for its full length, combined with longitudinal upper compression chord members arranged above the main portion of saw-tooth roof portions and secured to the framing thereof including the upper portions of the transverse open-mesh trussed girders, and supports for the front and rear ends of the roof.

4. In a saw-tooth roof structure, longitudinal truss framing, comprising upper compression chords, lower tension chords, deep transverse trussed girders spaced apart and secured at their lower portions to the tension chords and at their upper portions to the compression chords, a plurality of oblique intermediate roof supporting trusses of general triangular form secured at their upper portions to the transverse trussed girders and at their bottom portions to the tension chords, oblique roof covering supported by the oblique intermediate trusses below the compression chords, and sash covering secured to the transverse trussed girders intermediate of the compression and tension chords, the transverse trussed girders acting as compression members to the corresponding compression and tension chords and to provide a wide transverse span of roof and the oblique intermediate trusses acting as tension members in those portions of the roof below the compression chords.

5. A saw-tooth roof structure comprising a plurality, in excess of two, of parallel super-span trusses, each having a top compression chord, a bottom tension chord and post and tie members connecting them, and oblique roof sections extending between the top and bottom chords, combined with a truss having a height substantially equal to the distance between the top and bottom chords of the super-span trusses and arranged transversely to the length thereof, said transverse truss secured to each of the super-span trusses and also bridging the space between the outermost super-span trusses and sustaining the intermediate super-span truss or trusses, upright window sash framing of the saw tooth roofing arranged transversely of the super-span trusses and supported thereby, and supports for the outermost super-span trusses.

6. A saw-tooth roof structure comprising a plurality, in excess of two, of parallel super-span trusses, each having a top compression chord, a bottom tension chord and post and tie members connecting them, oblique roof sections extending between the top and bottom chords, and supports for the ends of the outermost super-span trusses, combined with a plurality of transversely arranged trusses extending between the outermost super-span trusses and secured fixedly in relation thereto and to the intermediate super-span truss or trusses, said transverse trusses acting as sustaining members for the intermediate super-span truss or trusses whereby supports beneath them may be omitted in whole or in part, and upright window sash framing of the saw tooth roofing arranged transversely of the super-span trusses and supported thereby.

In testimony of which invention, we hereunto set our hands this 29th day of April, 1921.

WALTER F. BALLINGER.
CLIFFORD H. SHIVERS.